United States Patent [19]

Clements et al.

[11] 4,413,335

[45] Nov. 1, 1983

[54] FAULT RECOVERY APPARATUS FOR A PCM SWITCHING NETWORK

[75] Inventors: John L. Clements; Stig E. Magnusson, both of Phoenix, Ariz.

[73] Assignee: GTE Automatic Electric Labs Inc., Northlake, Ill.

[21] Appl. No.: 325,252

[22] Filed: Nov. 27, 1981

[51] Int. Cl.³ .................. H04L 1/22; H04L 1/24; H04M 3/08

[52] U.S. Cl. ...................... 370/16; 179/175.2 R; 370/63; 371/22; 371/32; 371/68; 340/825.16

[58] Field of Search ......... 179/175, 175.2 R, 175.2 D; 340/825.01, 825.16; 370/13, 16, 17, 63; 371/5, 8, 22, 27, 32, 49, 68; 375/10; 455/8

[56] References Cited

U.S. PATENT DOCUMENTS

| | | | |
|---|---|---|---|
| 4,071,704 | 1/1978 | Moed | 179/175.2 R |
| 4,160,127 | 7/1979 | Slana et al. | 370/16 |
| 4,245,344 | 1/1981 | Richter | 371/68 |

Primary Examiner—Benedict V. Safourek
Attorney, Agent, or Firm—Frank J. Bogacz; Robert J. Black

[57] ABSTRACT

This fault recovery system determines the integrity of a duplex digital PCM switching network. The two copies of the switching network operate in synchronization and comparison of the outputs of each copy of the switching network takes place in order to detect network faults. The fault recovery mechanism is chiefly provided by inserting PCM samples from maintenance registers into the PCM data stream, through the digital switching network and trapping said PCM sample for analysis by the program. Subsequently, the logical unit corresponding to each fault is determined and a count is recorded corresponding to each unit.

10 Claims, 5 Drawing Figures

FIG. 5

FAULT RECOVERY APPARATUS FOR A PCM SWITCHING NETWORK

BACKGROUND OF THE INVENTION (1) Field of the Invention

This invention pertains to a system for recovering and diagnosing faults in a PCM digital switching system and more particularly to a system for the insertion of test PCM samples into the PCM data stream of a digital switching network and subsequent examination for fault of these test PCM samples.

(2) Description of the Prior Art

In electronic digital switching systems, duplex PCM networks with comparison between each of the network copies is known in the art. One such switching system is the GTD-4600 which is designed and manufactured by GTE Automatic Electric Incorporated. The maintenance aspects are further discussed in an article entitled "GTD-4600 Peripheral Equipment Maintenance" in the GTE Automatic Electric Journal, March, 1978. The GTD-4600 provides both comparison and parity checking for the PCM samples in the network.

In the GTD-4600 when a miscomparison is detected without a parity error, the recovery software would propogate PCM samples with the bad parity through the network and determine which network copy was operating correctly. As a result, the GTD-4600 network recovery system could only detect failures effecting single bits or all bits of the PCM samples.

In contrast, the present invention provides the ability to insert test PCM samples into the network and to trap the resultant output. As a result, this invention permits the insertion of any twelve bit pattern into the network and provides for a bit by bit analysis of each network output.

SUMMARY OF THE INVENTION

The object of the present invention is to provide a network fault recovery system to facilitate the transmission of test PCM samples through a digital switching network and for the trapping of the output of these samples for analysis and fault detection of the switching network.

It is another object of the present invention to provide for maintaining and updating fault counts associated with each unit of the digital switching network.

It is a further object of the present invention to provide for a determination of transient errors and for an automatic retry of the transmission in order to determine whether the transient error is a solid fault in the digital switching network.

In the present invention, telephone subscribers are connected via an analog line facility interface unit to the digital switching network. Other inputs to the digital switching network are provided to the network by the digital facility interface unit from digital spans. Lastly, an analog trunk facility interface unit provides the connection of trunks to the switching network.

A network clock, which snychronizes all the units of the switching network, controls the timing and operation of the switching network. The network is a time-space-time digital switching network. Each of the time switch and controls units includes a peripheral processor comprising a microprocessor CPU for controlling the switching operation. Basic control of the telephone switching operation as well as the administrative and maintenance aspects of switching is controlled by another computer complex which is connected to each of the time switch and control units and space switching unit via a message distribution circuit.

The software which operates the network recovery system executes on a central processing unit termed the administrative processor complex. Each of the central processing units is duplicated for reliability purposes. Each section of the digital switching network that is, each time switching control unit and space switching unit, is also duplicate and operates synchronously with its duplicated mate.

The analog line facility and face unit includes an analog line unit and a duplex pair of analog control units. A similar arrangement exists for the analog trunk facility interface unit.

Incoming data to the facility interface unit is converted from serial to parallel and transmitted through the multiplexer, whereafter parity is generated, and the data sample subsequently passed to the digital switching network. After switching the PCM data to the appropriate output time slot, it is transmitted out of the digital switching network, where parity is subsequently checked and comparisons made between the duplex network copies. Subsequently, the PCM data is demultiplexed, and converted from parallel to serial and transmitted out to the span or telephone subscriber.

When the network recovery program of the administrative processor complex determines that a fault exists, test PCM data samples are transmitted through the network for isolating fault. The program operates to formulate a word which will effectively isolate the fault that was detected. This word is then transmitted to one of a set of maintenance registers, which at the appropriate time slots switches the formulated test PCM sample into the PCM data stream input to the digital switching network. Then, the switching network operates to switch the PCM data sample to an appropriate output time slot. In the output PCM data stream comparisons are made between the duplex copies of the network units. Parity over the PCM data is also checked. In addition, the particular test PCM sample is trapped and removed from the PCM output data stream. Subsequently, the trapped PCM data sample is compared with the transmitted PCM data sample in order to determine the nature and location of the fault present in the network.

Due to the placement of the maintenance registers and trapping circuitry, a portion of the transmission path is unobserved for faults. As a result, a second maintenance feature is added to monitor the performance of the unobserved portion of the checking circuitry of the facility interface unit. A second set of maintenance registers is provided to insert test PCM data samples into the output data stream from the network. A loop around path is established so that the test PCM data samples being output from the network are transmitted as data inputs to the network. These data samples are switched into the input data stream of the digital network at the appropriate time slot.

These test data samples are converted from serial to parallel, passed through a multiplexer and trapped just prior to entering the first time stage of the switching network. These trapped data samples are then analyzed with the transmitted data samples bit by bit to determine whether a fault exists in the portion of the input and output circuitry previously unmonitored. In this manner, the whole path up to and through the switching network is examined for a fault.

Telephone calls may come into the digital switching system from either lines or trunks. Groups of each of such units are placed under common control and the controlling unit is called a peripheral control unit. There are five basic configurable units which are involved in the switching of a call by the digital switching network. These units are: an originating peripheral control unit, an originating time switch and control unit, space switching unit, a terminating time switch and control unit and a terminating peripheral control unit. Accordingly, in the storage means associated with the administrative processor complex, a table is kept indicating the fault status of each of these configurable units. When a parity error is detected in the PCM data sample and indicator marked data parity error (DPE) is marked corresponding to the particular unit in which the fault exists. These errors are eached marked separately since they can propogate along the network path.

In the time switch and control unit and in the space switching unit, these data parity errors are further divided into data parity input and data parity output errors. In addition, the terminating peripheral control unit contains an indicator which is marked when a miscomparison is detected between the two peripheral control unit copies. There is a flag indicator for each configurable unit which indicates whether any changes are made to that configurable unit's status. Each entry also contains the identity of the time switch and control unit where the error occurred.

When an error message is received for entry into a particular configurable unit's section, the recovery program in the administrative processor complex will check to determine whether an entry has already been made for that corresponding unit. If no entry has been made the entry is recorded, otherwise it will be ignored. This is done to allow for the possibility that single failure could result in similar errors in a number of the time switching control units. These indicators are kept for each copy of the duplex pair of configurable units.

When a miscomparison is detected with no parity error, the miscomparing test PCM samples in each copy of the network will be saved as a function of the particular configurable unit in which the miscomparison occurred. If a parity error is reported, the network copy with the parity error will be considered faulty and appropriate reconfiguration of the network will be initiated.

DESCRIPTION OF THE DRAWINGS

FIG. 5 is a diagram representing a memory map of the fault indicators of each of the configurable units of the digital switching network.

DESCRIPTION OF THE PREFERRED EMBODIMENT

Figure 1:
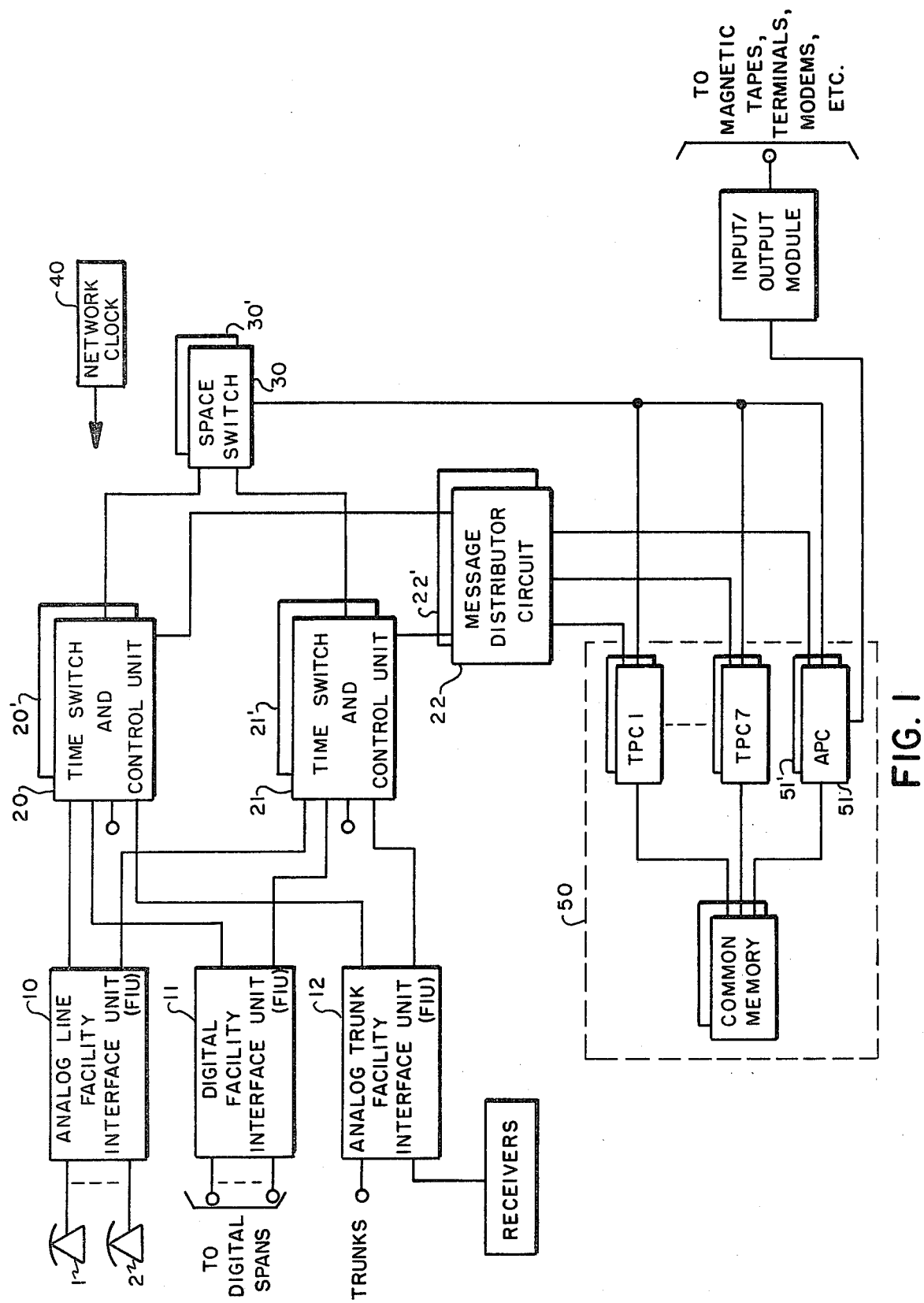
FIG. 1 is a block diagram depicting the switching network and common control of the digital telephone switching office containing the present invention.

Referring to FIG. 1, a time-space-time digital switching network along with the corresponding common control is shown. Telephone subscribers such as subscribers 1 and 2 are shown connected to analog line facility interface unit 10. Analog line unit 10 is connected to both copies of the originating time switch and control unit 20 and 20'. Time switches 20 and 20' are connected to duplex pair of space switch units 30 and 30' which are in turn connected to the terminating time switch and control units 21 and 21'. Time switch and control units 21 and 21' are connected to analog line facility interface unit 10 and ultimately to the telephone subscribers 1 and 2.

Digital facility interface unit 11 connects the digital span to the switching network. Similarly, analog trunk facility interface unit 12 connects trunk circuits to the digital switching network.

A microprocessor complex 50 controls the digital switching network. Duplicated pairs of microprocessor CPU's TPC1 through TPC7 are connected to the switching network and control the operation of the basic telephone switching. The administrative processor complex comprising microprocessor pair 51 and 51' operate the fault detection and recovery system of the digital switching network.

Figure 2:
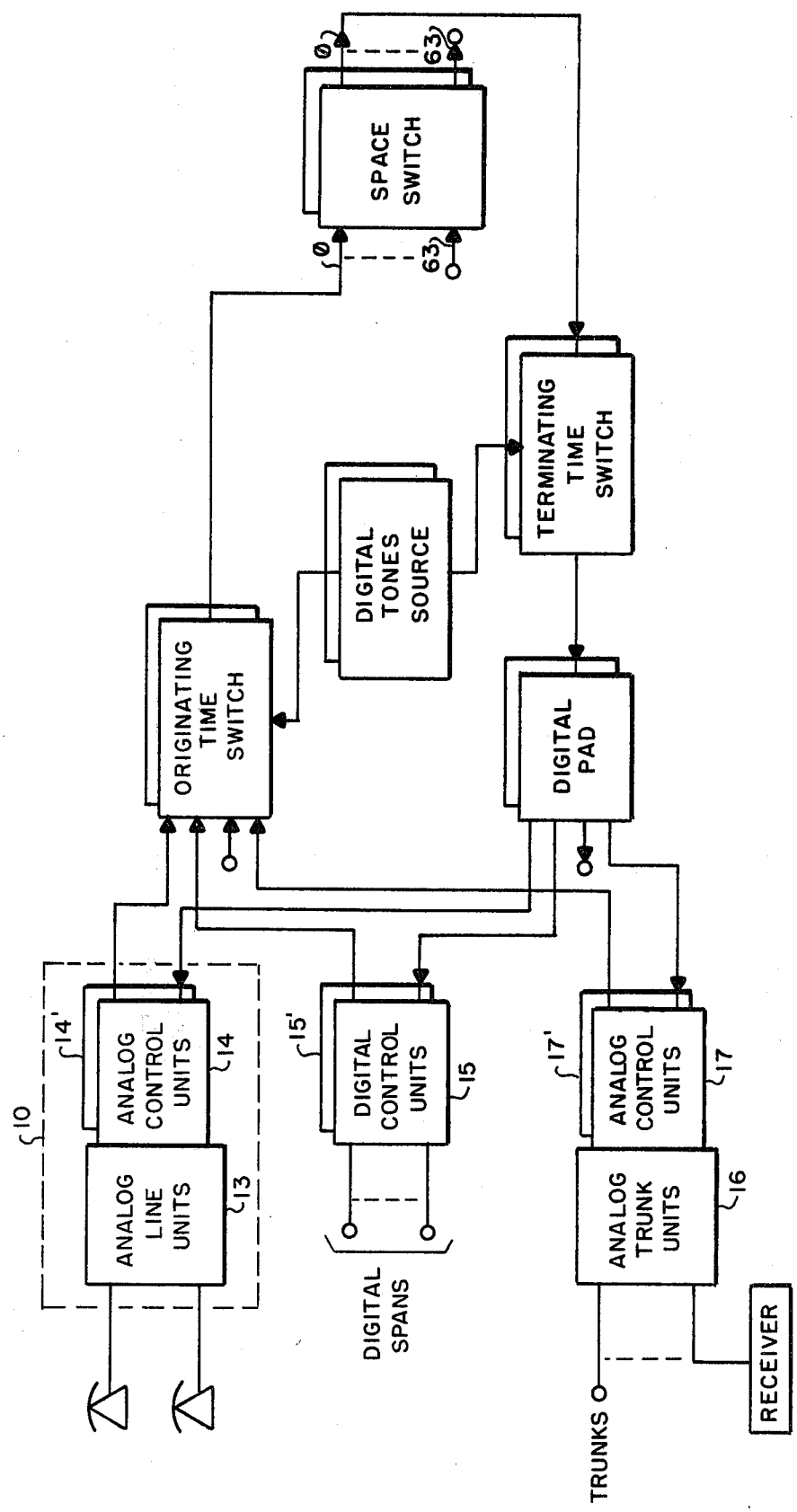
FIG. 2 is a block diagram of the digital switching network with expanded views of the facility interface units.

Referring to FIG. 2, an expanded view of analog line facility interface unit 10 is shown. Analog line unit 10 comprises an analog line unit 13 and a duplex pair of analog control units 14 and 14'. A duplicate pair of digital control units 15 and 15' control the incoming PCM data from the digital spans. Similarly the analog trunk facility interface unit 12 of FIG. 1 comprises an analog trunk unit 16 and a duplex pair of analog control units 17 and 17', shown in FIG. 2. The analog and digital control units are each duplicated for reliability purposes.

Figure 3:
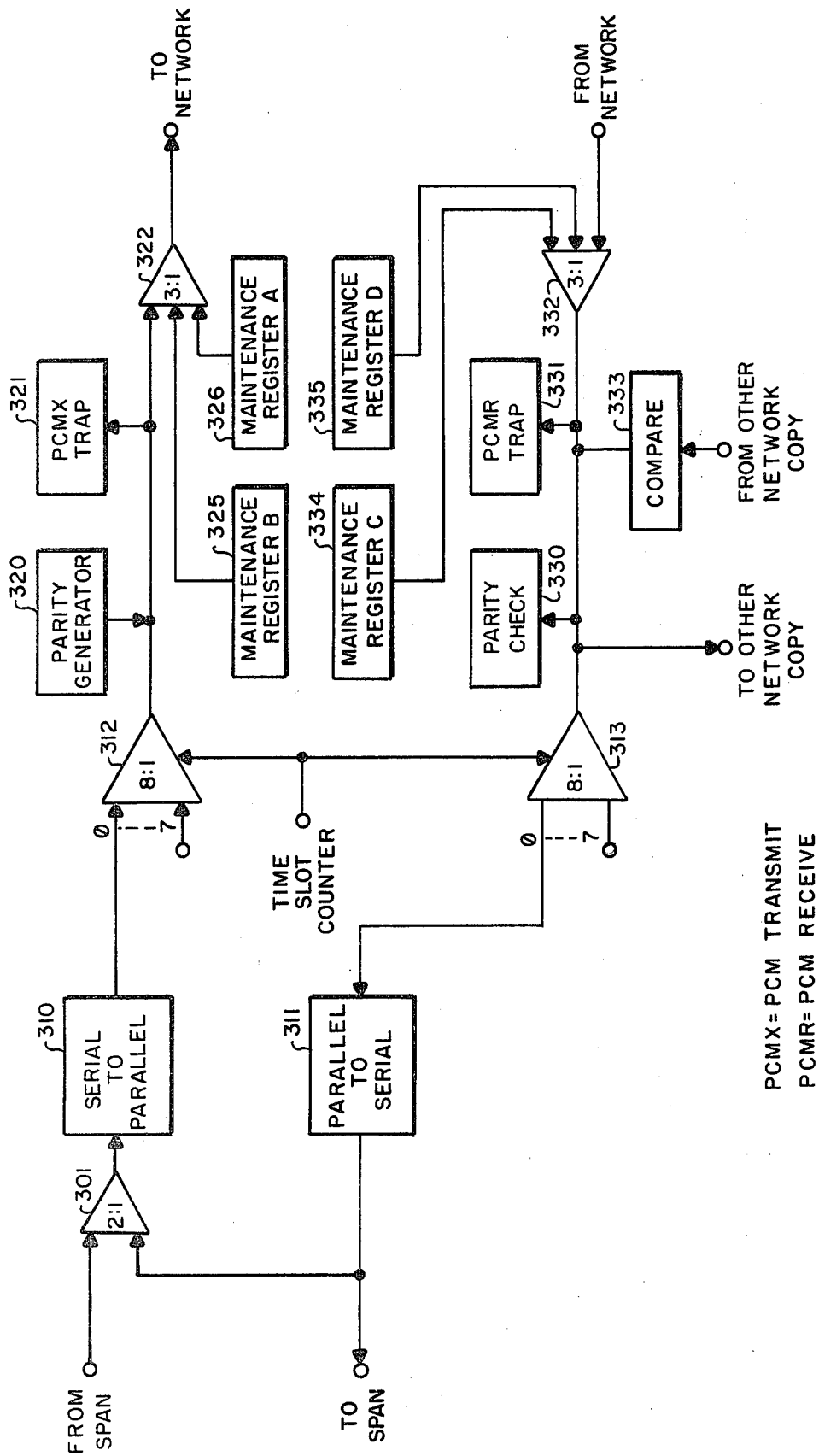
FIG. 3 is a block diagram depicting the principles of operation of the present invention.

FIG. 3 is a block diagram depicting the simplex operation of the present invention. Digital information may be input from analog line units, analog trunk units or from the digital spans. In FIG. 3, PCM information is shown coming from a digital span. The PCM information is transmitted through multiplexer 301 and is converted from serial to parallel by converter 310. The PCM data stream is 8 bits wide. In addition, 3 bits of supervisory information are added. The PCM data is then transmitted through multiplexer 312 and a parity bit is added by the parity generator 320. The PCM information is then transmitted through multiplexer 322 to the time-space-time switching network. The network switches the information in incoming time slots to locations at the appropriate output time slots.

As each PCM data sample emerges from the network, it is transmitted through multiplexer 332 and is compared with the corresponding PCM data sample from the duplex copy of this unit by comparator 333. In addition, this sample is transmitted to the other network copy for similar comparison. Subsequently, parity which was generated is checked by parity checker 330. Data then is transmitted through the multiplexer 313 and converted from parallel to serial and current transmitted to the digital span.

When an error is detected by comparator 333, the PCM data and time slot information are trapped by PCM receive trap 331. An automatic retry is then indicated by inserting the data into the PCM input stream at the proper time slot. When, on the retry, a fault is detected, a message is transmitted to the administrative processor complex. The recovery software of the administrative processor complex with then test the network path by transmitting test PCM data samples.

This test accomplished by loading maintenance register A 326 or maintenance register B 325 with the particular test pattern of bits PCM data. At the appropriate time slot, multiplexer 322 is switched to enable the contents of mainteance register A 326 to be transmitted to the network. As this test PCM sample emerges from the network through multiplexer 332, it is trapped by PCM receive trap 331. Parity checking and comparison are provided as outlined above. The trapped data is then compared with the transmitted data to determine the nature and location of the fault. After a number of different bit patterns are transmitted, each bit in the data sample can be verified for accuracy. As a result the operation of the network is verified and faults isolated.

It is required that the remainder of the equipment in the PCM data stream be checked. Accordingly, maintenance registers C and D, 334 and 335 respectively, operate in a fashion similar to that set out above for maintenance registers A and B. Under control of the administrative processor complex, PCM samples are injected via multiplexer 332 from one or both of the maintenance registers C and D into the output PCM stream. Data is transmitted through the multiplexer 313 and conversion is performed by parallel to serial converter 311. At the appropriate time slot, a connection is established from the outgoing PCM data path through multiplexer 301, thereby the test PCM data is then transmitted through serial to parallel converter 310, multiplexer 312 and is trapped by PCM transmit trap 321. This PCM test data is then transmitted to the administrative processor complex, where it is analyzed as previously described. After a sufficient number of samples are transmitted in this manner the verification of the remaining portion of the network operation is accomplished.

Figure 4:
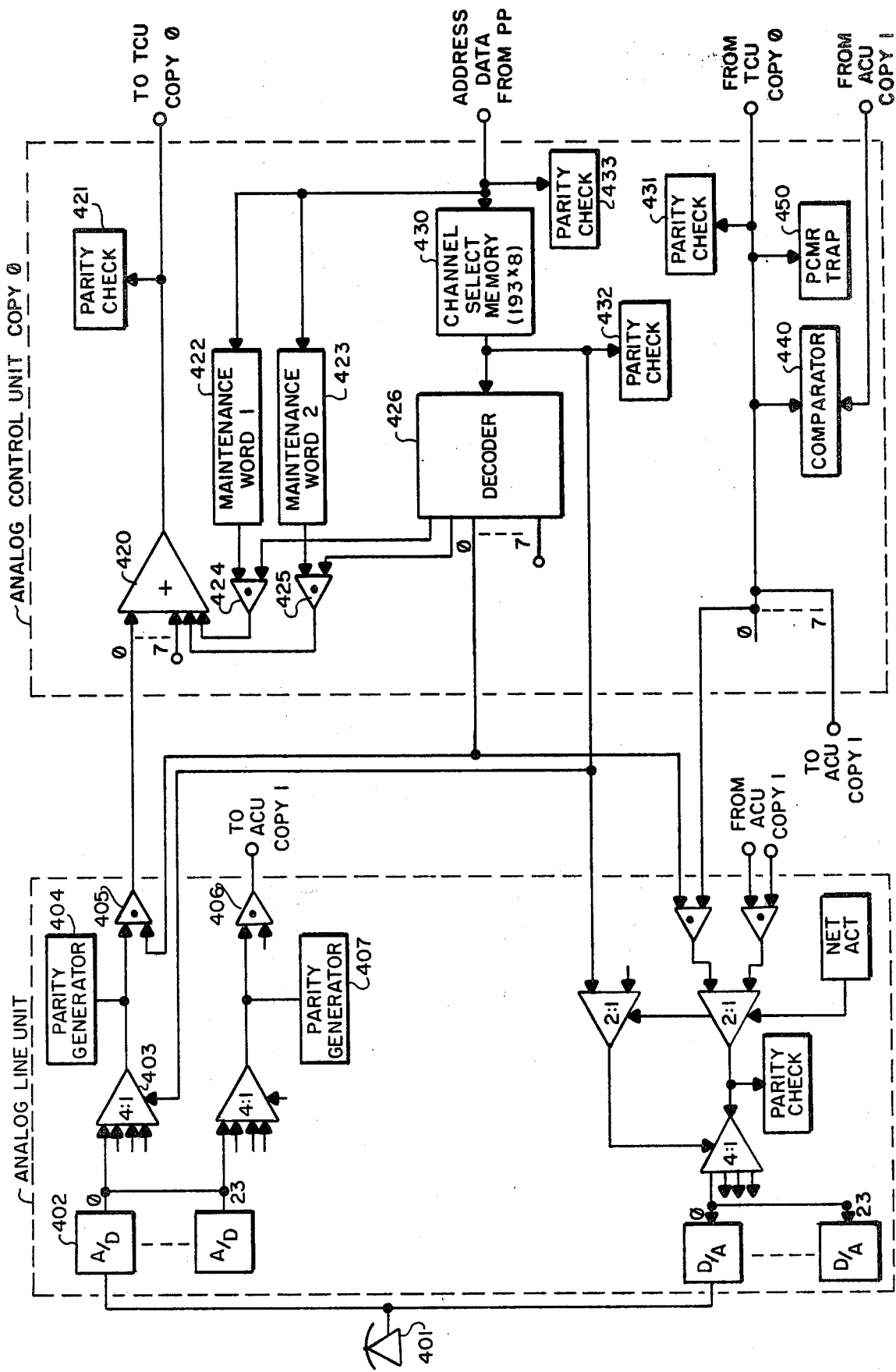
FIG. 4 is a schematic diagram further expanding the principles of operation of the present invention.

Referring to FIG. 4, a schematic view of the block diagram of FIG. 3 is shown. FIG. 4 shows the subscriber 401 connected to an analog line unit and the connection of the analog line unit to copy 0 of the duplex pair of analog control units. It is to be noted that copy 1 of the analog control unit operates synchronously with the operation given for copy 0 herein.

Incoming analog data from subscriber 401 is converted from analog to digital by converter 402 and transmitted through multiplex 403 where parity is added by parity generator 404. The data is then transmitted through AND gate 405 to multiplexer 420.

When a fault is detected as mentioned above, this PCM data stream is interrupted and the contents of maintenance word 1 422 corresponding to maintenance register A of FIG. 3 is transmitted through multiplexer 420 instead of the incoming data. Alternately maintenance word 2 423 corresponding to maintenance register B of circuit 3 may be employed to transmit a second test PCM data sample through the network. Under the direction of the administrative processor complex, the test PCM samples are transmitted to maintenance word 1 422 via a peripheral processor located in the network. Then, the administrative processor complex instructs the peripheral processor to write the channel select memory 430 with the time slot identity at which the contents of maintenance word 1 422 is to be transmitted. At the appropriate time slot, the address is converted by decoder 426 and the contents of maintenance word 1 422 is transmitted through AND gate 424 to multiplexer 420. The test PCM sample enters the PCM data stream and is switched through the digital switching network.

As this test PCM sample emerges from the network, the parity is examined by parity check 431 and a comparison is made by comparator 440 with the data sample from the copy 1 of the analog control unit. The data itself is trapped by PCM receive trap 450. The trapped PCM sample is then analyzed with the test PCM sample transmitted by maintenance word 1 422 and after a number of bit patterns have been similarly transmitted, a fault of a particular bit is detected and reconfiguration of network units initiated.

Figure 5:
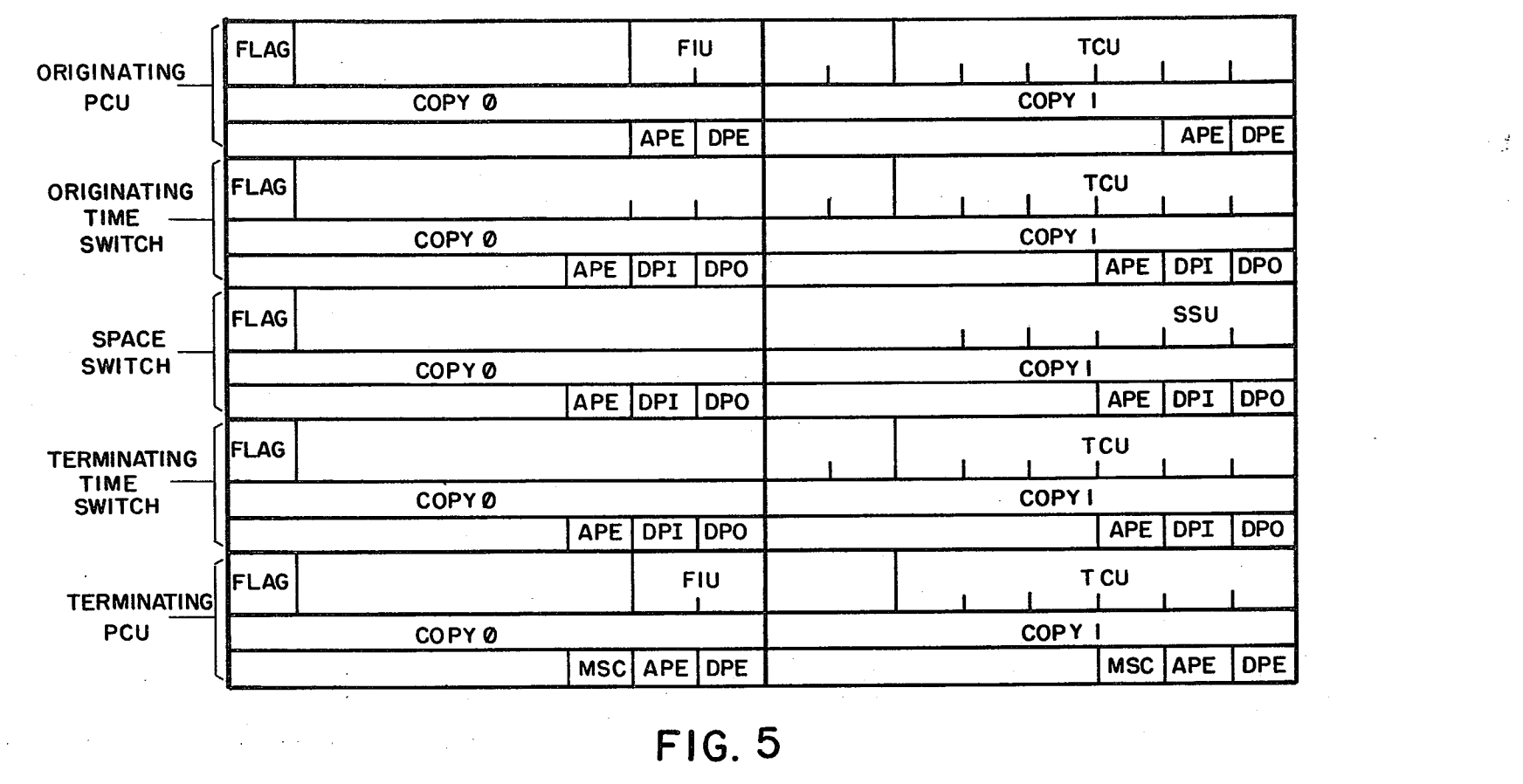

Referring to FIG. 5, a status table kept in the common memory associated with the administrative processor complex is shown. The five basic reconfigurable units are shown along the left margin. They are: the originating peripheral control unit (analog line, analog trunk or digital control unit) originating time switch, space switch, terminating time switch and terminating peripheral control unit. The operating recovery program controls the analysis and marking of this table. Since each of these units is duplex, the table is divided into two halves, copy 0 for the first of the duplex pair, and copy 1 of the second of the pair. When a parity error in the PCM sample is detected, the data parity error DPE field is marked accordingly. For the switching network including the originating time switch space switch and terminating time switch, data parity errors are further segregated into data parity error input DPI and data parity error output DPO and marked as a function of the particular copy exhibiting a fault. The flag field will be set for each reconfigurable unit for which an updated entry is made.

As the data emerges from the switching network a comparison is made between the copies and any miscomparison error is marked in the field MSC. For the originating and terminating peripheral control units, the identity of the particular facility interface unit involved is also recorded. This table is interpreted by the recovery software of the administrative processor complex in order to determine which configurable unit is at fault.

Although a preferred embodiment of the invention has been illustrated, and that form described in detail, it will be readily apparent to those skilled in the art that various modifications may be made therein, without departing from the spirit of the invention or from the scope of the appended claims.

What is claimed is:
1. In a digital telephone switching office, network fault recovery apparatus comprising:
  a digital switching network for transmitting PCM data samples from specific input times slots to specific output time slots;
  said digital switching network including a first and a second synchronously operated network unit, each of said network units providing identical PCM data samples in identical time slots;
  means for formulating a test PCM data sample;
  means for switching connected to said digital switching network and operated to interrupt said transmission of said PCM data samples through said digital switching network;
  means for transmitting said test PCM data sample connected to said digital switching network via said switching means, said means for transmitting operated in response to said interruption of said transmission of said PCM data samples;

means for comparing said PCM data samples of identical time slots of said first and said second network units, said means for comparing operated to detect any non-conformity of said PCM data samples of said first with said PCM data samples of said second network units;

means for trapping a PCM data sample from a specific output time slot, said means for trapping connected to said digital switching network; and means for analyzing said transmitted test PCM data sample with said PCM data sample trapped from said output time slot and further analyzing said test PCM data sample of said first network unit and said test PCM data sample of said second network unit in said identical time slot with said transmitted test PCM data sample whereby, a determination of a fault is made for each particular bit of each said trapped PCM data sample.

2. Network fault recovery apparatus as claimed in claim 1, wherein there is further included:

means for generating parity on each of said PCM data samples transmitted to said digital switching network in input time slots; and means for checking said generated parity of each of said PCM data samples in said output time slots.

3. Fault recovery apparatus as claimed in claim 2, wherein said means for transmitting includes:

first and second register means, each of said register means providing for transmitting one said test PCM data sample through said digital switching network;

multiplexing means connected between each of said first and said second register means and said digital switching network and operated to connect said first register means to said digital switching network and alternately to connect said second register means to said digital switching network.

4. Fault recovery apparatus as claimed in claim 3, wherein there is further included:

a central processing unit;

memory means connected to said central processing unit;

decoding means connected between said memory means and each of said first and second register means and operated to enable said first register means and alternately operated to enable said second register means to receive test PCM data samples transmitted from said central processing unit.

5. Fault recovery apparatus as claimed in claim 4, wherein said means for comparing includes means for initiating said transmission of said test PCM data sample through said digital switching network in said specific input time slots and receiving said test PCM data sample in said specific output time slots whereby for a retransmission is automatically initiated for a non-conformity of said trapped PCM data sample with said transmitted test PCM data sample.

6. Fault recovery apparatus as claimed in claim 5, wherein there is further included:

storage means;

means operated in response to said determination of said fault to isolate a particular unit of said digital switching network at fault and to store in said storage means an indication of the number of such fault occurrences.

7. Fault recovery apparatus as claimed in claim 6, wherein said digital switching network includes a time-space-time digital switching network.

8. In a digital telephone switching office, network fault recovery apparatus comprising:

telephone subscribers;

a digital switching network for transmitting PCM data samples from specific input time slots to specific output time slots;

means for formulating a test PCM data sampling;

means for switching connected to said digital switching network and operated to interrupt said transmission of said PCM data samples from said digital switching network to said telephone subscribers;

means for transmitting said test PCM data sample connected to said digital switching network via said switching means, said means for transmitting operated in response to said interruption of said transmission of said PCM data samples;

a connection between said means for transmitting and said digital switching network established in response to said transmission of said test PCM data sample to connect said means for transmitting to said digital switching network;

means for trapping said test PCM data sample, said means for trapping connected to said digital switching network; and means for analyzing said transmitted test PCM data sample with said trapped test PCM data sample whereby, each of said bits of said PCM data sample transmitted to said telephone subscriber are verified for conformity with said transmitted test PCM data sample.

9. Network fault recovery apparatus as claimed in claim 8, wherein there is further included:

output conversion means connected between said digital switching network and said telephone subscribers;

input conversion means connected between said telephone subscribers and said digital switching network.

10. Network fault recovery apparatus as claimed in claim 8, wherein there is further included:

a central processing unit;

memory means connected to said central processing unit;

decoding means connected between said memory means and each of said first and second register means and operated to enable said first register means and alternately operated to enable said second register means to receive test PCM data samples transmitted from said central processing unit.

* * * * *